US012059377B2

(12) United States Patent
Cordeiro et al.

(10) Patent No.: US 12,059,377 B2
(45) Date of Patent: Aug. 13, 2024

(54) HEATED STRETCHER

(71) Applicant: Science to Business Limited, London (GB)

(72) Inventors: Mary Anne Cordeiro, London (GB); Jeremy Mauger, Bury St Edmunds (GB); Alastair Wilson, King's Lynn (GB); Russell Overend, Port Glasgow (GB); Stephen McIntosh, Glasgow (GB)

(73) Assignee: THERMOTRAUMAPORT LIMITED, London (GB)

( * ) Notice: Subject to any disclaimer, the term of this patent is extended or adjusted under 35 U.S.C. 154(b) by 29 days.

(21) Appl. No.: 17/789,995

(22) PCT Filed: Dec. 24, 2020

(86) PCT No.: PCT/EP2020/087858
§ 371 (c)(1),
(2) Date: Jun. 29, 2022

(87) PCT Pub. No.: WO2021/136743
PCT Pub. Date: Jul. 8, 2021

(65) Prior Publication Data

US 2023/0050089 A1 Feb. 16, 2023

(30) Foreign Application Priority Data

Dec. 31, 2019 (GB) ..................................... 1919463

(51) Int. Cl.
*A61G 1/04* (2006.01)
*A61G 1/00* (2006.01)

(52) U.S. Cl.
CPC ................ *A61G 1/04* (2013.01); *A61G 1/00* (2013.01); *A61G 2210/50* (2013.01); *A61G 2210/90* (2013.01)

(58) Field of Classification Search
CPC ........ A61G 1/04; A61G 1/00; A61G 2210/50; A61G 2210/90; A61B 6/04; A61B 6/0407; A61B 6/0442; A61B 6/045
(Continued)

(56) References Cited

U.S. PATENT DOCUMENTS 3,151,343 A * 10/1964 McCormick ........... A61G 1/044 5/628
5,214,813 A * 6/1993 Gastle ...................... A61G 1/01 5/625
(Continued)

FOREIGN PATENT DOCUMENTS

DE 102015007526 A1 12/2016
EP 4084759 B1 * 2/2024 .............. A61G 1/00
(Continued)

OTHER PUBLICATIONS

PCT International Search Report for corresponding PCT Application No. PCT/EP2020/087858, mailed on Jun. 1, 2021, 20 pages.

*Primary Examiner* — Robert G Santos
(74) *Attorney, Agent, or Firm* — Dority & Manning, P.A.

(57) ABSTRACT

A stretcher with a heated section, the heated section of the stretcher comprising: two opposing electrically conductive elements positioned at, or towards, opposing sides of the stretcher, wherein the opposing electrically conductive elements are connectable to a power source; an electrically conductive layer in electrical contact with the opposing electrically conductive elements, to heat up when the opposing electrically conductive elements are powered by the power source; such that the electrically conductive layer is X-ray transparent to allow a patient to be X-rayed whilst on the stretcher.

18 Claims, 2 Drawing Sheets

(58) Field of Classification Search
USPC ............... 5/601, 600, 625; 378/208, 209, 20
See application file for complete search history.

(56) References Cited

U.S. PATENT DOCUMENTS

| | | | | |
|---|---|---|---|---|
| 5,333,335 | A * | 8/1994 | Gastle | A61G 1/01 5/625 |
| 5,771,513 | A * | 6/1998 | Kirchgeorg | A61B 6/0421 5/601 |
| 6,582,456 | B1 * | 6/2003 | Hand | A61G 1/00 219/217 |
| 6,653,607 | B2 * | 11/2003 | Ellis | A61F 7/007 219/217 |
| 6,924,467 | B2 * | 8/2005 | Ellis | A61F 7/007 219/217 |
| 7,176,419 | B2 * | 2/2007 | Ellis | A61F 7/007 219/217 |
| 7,725,967 | B2 * | 6/2010 | Simmerer | A61G 1/01 5/81.1 R |
| 10,193,209 | B2 * | 1/2019 | Blair | A61F 7/007 |
| 2002/0019654 | A1 * | 2/2002 | Ellis | A61F 7/007 607/98 |
| 2004/0112891 | A1 * | 6/2004 | Ellis | A61F 7/007 219/217 |
| 2006/0020311 | A1 * | 1/2006 | Ellis | A61F 7/007 607/96 |
| 2007/0251007 | A1 | 11/2007 | Simmerer et al. | |
| 2016/0294040 | A1 * | 10/2016 | Blair | H01Q 1/22 |
| 2018/0213944 | A1 | 8/2018 | Bedel et al. | |
| 2023/0050089 | A1 * | 2/2023 | Cordeiro | A61G 1/04 |

FOREIGN PATENT DOCUMENTS

| | | | | |
|---|---|---|---|---|
| GB | 2591082 A * | 7/2021 | | A61G 1/00 |
| KR | 2005/0112272 | 11/2005 | | |
| WO | WO-2021136743 A1 * | 7/2021 | | A61G 1/00 |

* cited by examiner

HEATED STRETCHER

CROSS REFERENCE TO RELATED APPLICATIONS

This application is the U.S. National Stage entry of International Application No. PCT/EP2020/087858 filed under the Patent Cooperation Treaty on Dec. 24, 2020, which claims priority to United Kingdom Patent Application No. 1919463.8 filed on Dec. 31, 2019, both of which are incorporated herein by reference.

FIELD

This invention relates to stretchers for carrying emergency and critical care patients.

BACKGROUND

Stretchers are used often used to carry people to or from an ambulance or between locations in a hospital. In some situations, there may be advantages to providing some warmth to a patient on a stretcher, for example, to regulate body temperature of the patient. There exist known stretchers that are configured to provide a level of heating to a patient who is positioned on the stretcher. Generally speaking, it is known that trauma patients have difficulty in regulating their body temperatures, particularly in cold climates. Current practice by ambulance crews involves transferring patients from the site of an accident on scoop stretchers or spinal boards which are hard and cold. This not only causes possible pressure sores but greater risk of developing hypothermia with resultant poor patient outcomes and unnecessary additional costs to the healthcare system.

The inventors have identified several further problems with known heated stretchers. One problem is that the heating mechanisms in heated stretchers appear on medical scans (such as an X-ray scan or CT scan), therefore a patient on such a heated stretcher will need to be removed from the stretcher to receive such a scan. This is a problem because the inventors have recognised that there is an increased risk of injury the more times a patient is moved on to, and off, a stretcher.

A related problem identified by the inventors is that known stretchers (heated and non-heated) are bulky and difficult to store. In particular, heated stretchers may be bulky and not portable due to their heating mechanism. The inventors have identified that this is particularly a problem if the stretcher is to be stored in a location with limited space, such as an air ambulance (e.g. a helicopter), a rapid response vehicle, or carried in a back-pack. Background prior art can be found in KR2005/0112272 and US2018/0213944.

SUMMARY

According to a first aspect there is provided a stretcher with a heated section. The heated section of the stretcher may comprise two opposing electrically conductive elements positioned at, or towards, opposing sides of the stretcher. The opposing electrically conductive elements may be connectable to a power source. The heated section of the stretcher may comprise an electrically conductive layer in electrical contact with the opposing electrically conductive elements, to heat up when the opposing electrically conductive elements are powered by the power source. The electrically conductive layer may be X-ray transparent to allow a patient to be X-rayed whilst on the stretcher.

A stretcher may be a device used to transfer and/or hold a patient. A stretcher may be referred to as a patient transfer device. The patient may be an adult or a child, embodiments of the invention can be provided to accommodate for a range of sizes of patients.

The stretcher may have a heated section. The heated section means a portion of the stretcher that is configured to be heated. The portion may be the entirety of the stretcher or may be less than the entirety. In embodiments the heated section may cover approximately a half to two thirds of a surface of the stretcher. In embodiments, the stretcher has a generally oblong shape having a major length and a minor length. The major length may herein be referred to as an extended length. The stretcher is generally configured to provide a surface for the patient to lie on along the major length of the stretcher. In embodiments of the present invention, the heated section of the stretcher is configured to heat a portion of the surface. The heated section of the stretcher may comprise two opposing electrically conductive elements positioned at, or towards, opposing sides of the stretcher. In embodiments, each of the opposing electrically conductive elements runs along each of the major lengths of the stretcher. In embodiments, an edge of a perimeter of the heated section may be defined by a length of each opposing electrically conductive element and the heated section may be provided between the two opposing electrically conductive elements. The opposing electrically conductive elements may be considered to be opposing electrically conductive electrodes.

The opposing electrically conductive elements may be connectable to a power source. The power source may be a battery. The power source may be a rechargeable battery.

If the power source is a battery (rechargeable or non-rechargeable), the battery may be a removable battery or may be a fixed battery forming part of the stretcher. The opposing electrically conductive elements may be considered to be a wiring layer. The opposing electrically conductive elements may be considered metal bus bars wired to a battery and on/off switch. Additionally, one or more of a thermistor, a thermocouple and a heater control circuit may be installed in the circuit comprising the opposing electrically conductive elements. The opposing electrically conductive elements may be positioned outside of an area defined by a body of a patient when the patient is positioned on the stretcher, this means that if an X-ray scan is taken of the patient (whilst the patient is on the stretcher) the opposing electrically conductive elements are not interfering with the X-ray scan of the body.

The electrically conductive layer may be in electrical contact with the opposing electrically conductive elements. This provides for a complete circuit to be formed, the complete circuit comprising the power source, the electrically conductive layer, and the opposing electrically conductive elements. Charge can flow from a first of the opposing electrically conductive elements, across the electrically conductive layer, to a second opposing electrically conductive element. The electrically conductive layer may heat up when there is an electrical current flowing across the electrically conductive layer, this is due to an electrical resistance of the electrically conductive layer. The electrical resistance of the electrically conductive layer may be a sheet resistance. In other words, the electrically conductive layer heats due to the electrically conductive layer conducting electricity between the two opposing electrically conductive elements. Advantageously, this may provide for a generally uniform heating rather than, for example, a metal heating filament that provides localised heating. This is advantageous because localised heating may burn a patient lying on the stretcher. Further advantageously, embodiments of the present invention provide a generally constant heating effect to all parts of a body of a patient on the stretcher, this allows a patient to be warmed to a specific temperature.

The temperature to which the heated section is heated up to is not fixed. The heated section may be heated to temperatures controlled in a number of ways including heating to a controlled temperature, heated to a number of pre-set temperatures, heating to a number of predetermined powers. Preferably the heated section provides enough heat to warm a patient but not so much heat that the patient is burnt. Embodiments of the invention allow this to be more easily achieved due to a constant heating effect across the heated section which lowers the risk of localised burning (due to, for example, a heating filament).

The heated section may be configured to have non uniform heating. The heated section may be configured to provide more heating for some parts of a body of a patient on the stretcher and less heating for other parts of the body. Advantageously this would allow, for example, more heat to be applied to the areas in most contact with the stretcher (e.g. shoulders) and less heating to areas in less contact with the stretcher (e.g. arch of the back). This non uniform heating could be achieved in one or more ways, for example: a conductivity of the electrically conductive layer could be higher or lower in different portions of the heated section by means of variable sheet resistance; the electrically conductive layer may comprise holes or other discontinuities; the opposing electrically conductive elements may be closer together in regions where more heating is required and further apart in regions where less heating is required. One or more of these examples may be present in an embodiment.

The electrically conductive layer may be X-ray transparent to allow a patient to be X-rayed whilst on the stretcher. This is advantageous because the stretcher may be used to transfer a patient from an initial position, for example at a scene of a vehicle accident, to an ambulance, the stretcher may then be used to transfer the patient from the ambulance to the hospital. Once in the hospital, embodiments of the present invention provide for the patient to be further transferred on the stretcher to and from a medical scan such as an X-ray. The patient may then be transferred on the stretcher to a hospital bed following the medical scan. Advantageously, embodiments of the invention provide for all these described transfers to occur without moving the patient off the stretcher. This is advantageous because moving a patient off, and on to, a stretcher poses a risk of causing further injury to the patient (this includes aggravating an internal soft-tissue injury), additionally there is a further risk of causing unnecessary stress or discomfort to a patient each time they are moved. The advantages of providing a stretcher that reduces the number of times that a patient needs to be moved onto/off the stretcher is particularly advantageous in situations where the patient is suffering from a neck, head, or back injury. In these situations, it is particularly advantageous to move the patient as few times as possible.

Embodiments of the invention therefore provide for a stretcher that makes it possible for a patient to be placed onto the stretcher at a scene of the injury and be warmed as soon as the patient is placed on the stretcher. The stretcher bearing the patient can then be placed in a transportation unit such as an ambulance trolley and taken to a hospital. In the hospital, the stretcher bearing the patient can be taken to an X-ray machine and X-ray scans can be taken of the patient, further scans may be performed such as a CT scan. The stretcher bearing the patient can then be moved to a hospital bed. Therefore, in this example of an embodiment of the invention. the patient is only moved once (i.e. onto the stretcher initially) during the entirety of these actions. This is a large improvement over known heated stretchers, where a patient may have to be moved multiple times on and off the stretcher. As described above, an advantage of embodiments of the present invention is that the electrically conductive layer is transparent to X-rays and CT scans. Although the opposing electrically conductive elements show up on X-rays, they are outside of the area of the body so would not interfere with the interpretation of the X-ray. In other words, known stretchers that use, for example either metal filaments, are expensive, lumpy to lie on, provide only localized heating (leading to the risk of local scalding of the patient), and interfere with the interpretation of the X-ray image. Embodiments of the present invention overcome all these problems.

The electrically conductive layer may comprise an electrical conductor extending in two dimensions within the electrically conductive layer. In embodiments, the electrically conductive layer extends in two dimensions to form a planar surface. For example, the electrically conductive layer may be formed of a conductive material so as to form an electrically conductive plane. This is different to, for example, a non-conductive material having a continuous metal filament running up and down the non-conductive material. The electrically conductive layer may comprise an electrical conductor extending substantially continuously in two dimensions within the electrically conductive layer. If the electrical conductor extends substantially continuously in two dimensions then this advantageously provides for a continuous, and optionally uniform, heating effect.

In embodiments, the electrically conductive layer may comprise an electrical conductor extending, with interruptions and/or irregularities, in two dimensions within the electrically conductive layer. For example, the electrical conductor may comprise holes: the electrical conductor may be formed as a lattice. This may provide an advantage of a designed non-continuous heating effect that could be designed to provide extra warmth to certain areas, such as the back.

The stretcher may comprise an electrically insulating layer configured to electrically insulate the electrically conductive layer from a user (e.g. a patient and or a bearer) of the stretcher. The stretcher may comprise an electrically insulating layer configured to electrically insulate at least a portion of the opposing electrically conductive elements from a user of the stretcher. The stretcher may comprise an electrically insulating layer configured to electrically insulate the electrically conductive layer and at least a portion of the opposing electrically conductive elements from a user of the stretcher, such a user may be a bearer of the stretcher. Advantageously this prevents a patient (and/or a bearer) of the stretcher from generating a local short circuit due to a conductive item of clothing (e.g. metal belt) coming into contact with the electrically conductive layer. The electrically insulating layer may be, for example: an electrically insulating casing encasing the electrically conductive layer; an electrically insulating cover configured to cover the electrically conductive layer and at least a portion of the opposing electrically conductive elements; or an electrically insulating film on the electrically conductive layer and at least a portion of the opposing electrically conductive elements. The electrically insulating layer may be configured to electrically insulate only a portion of the opposing electrically conductive elements rather than the entirety of the opposing electrically conductive elements because the opposing electrically conductive elements may be insulated by a wire coating at a portion of the opposing electrically conductive elements that is closer to the portion of the opposing electrically conductive element configured to be connectable to the power source. Therefore, the opposing electrically conductive elements may be electrically insulated from a patient by a combination of the electrically insulating layer and a wire covering.

The electrically conductive layer may comprise an electrically conductive polymer. The electrically conductive layer may comprise an electrically conductive non-metallic polymer. The electrically conductive layer may comprise an organic conductor. The electrically conductive layer may comprise a conductive substance as a powdered filler. The electrically conductive layer may comprise an electrically conductive polymer where the electrically conductive polymer is an electrically conductive elastomer. Advantageously, an electrically conductive elastomer provides for increased comfort for a patient. This is because the electrically conductive elastomer provides elasticity that means the stretcher is softer to lie on for the patient because the electrically conductive elastomer can be compressed. Additionally, as embodiments do not comprise, for example a heating filament, then the combination of a compressible electrically conductive elastomer and the absence of, for example, a heating filament running throughout the surface of the stretcher means that the stretcher is more comfortable for a patient.

The electrically conductive layer may comprise silicone rubber.

The electrically conductive layer may comprise a conductive additive. The conductive additive may comprise carbon. Therefore, in a preferable embodiment the electrically conductive layer comprises a silicone material loaded with carbon. Advantageously, carbon loaded silicone may be cheaper to manufacture than, for example a silver loaded silicone material. Further advantageously, an electrically conductive layer comprising carbon loaded silicone will be more X-ray transparent than an electrically conductive layer comprising silicone material loaded with metal particles. Other examples of X-ray transparent conductors for use in the electrically conductive layer are: carbon-loaded epoxy, carbon-loaded thermoplastic elastomer. In other words, in embodiments the electrically conductive layer may comprise one or more of: carbon-loaded epoxy, and carbon-loaded thermoplastic elastomer. The electrically conductive layer may have a low density due to the electrically conductive layer being loaded with, for example, carbon rather than a metal (where carbon has a lower molecular weight than a metal).

In embodiments, the electrically conductive layer is configured to have a thickness ranging from 1-5 mm. The thickness may be constant throughout the electrically conductive layer.

The opposing electrically conductive elements may be incapsulated within the electrically conductive layer. The opposing electrically conductive elements may be, for example, extruded inside the material of the electrically conductive layer or laminated between two sheets of the electrically conductive layer.

The electrically conductive layer may be configured to have a substantially uniform resistivity. Advantageously this provides for the heated section providing a uniformly heating area. This decreases the chance of a patient being burned. The substantially uniform resistivity may be a result of the electrical conductor extending substantially continuously in two dimensions within the electrically conductive layer.

A distance between the opposing electrically conductive elements may be constant for at least a part of their length. In other words, the opposing electrically conductive elements may be parallel. The distance may be substantially equal to a width of the stretcher. Advantageously this provides for the heated section providing a uniformly heating area. This decreases the chance of a patient being burned. The distance between the opposing electrically conductive elements may be constant for the entire length of the heated section.

The distance between the opposing electrically conductive elements may be reduced for part of their length to increase the patient warming in that part of their length. This means that embodiments of the invention provide for an increased temperature at a specific portion of the heated section. This intentionally increased heated section is advantageous as selected parts of the stretcher may be heated to a higher level than other areas. For example, the distance between the opposing electrically conductive elements may be reduced at points where a patient's shoulder and buttocks area may be positioned when the patient is positioned on the stretcher.

The stretcher may comprise a cover. In some implementations the cover is intended for single use; in other implementations the same cover may be used multiple times. The cover may be a protective cover and/or a waterproof cover. The cover may be referred to as a case. Advantageously, the cover prevents cross contamination of fluids from one patient to another and keeps any fluid away from the power source (e.g. a battery). The cover may comprise a polymer. The cover may comprise polythene.

The cover may form a sheath configured to slide over an outer surface of the stretcher, in other words, the cover may be a case having a single opening that slides over an outer surface of the stretcher. In this example the cover may comprise an attachment, such as Velcro, buttons, etc., at the single opening to secure the cover. For example, the cover may be a thick polythene bag having handles on both sides of the cover and an attachment to seal an opening of the cover.

The cover may comprise an electronic identifier for determining a metric associated with a use of the cover. The cover may be configured to be a single use cover. The cover may be configured to cover an outer surface of the stretcher. In embodiments, the cover comprises the insulating layer. The electronic identifier may be an RFID based identifier such as an RFID tag. The electronic identifier may be an NFC based identifier.

The electronic identifier may be configured to interact with a system for enforcing single use of the cover. The electronic identifier may prevent, and/or discourage, re-use of a contaminated cover, where a contaminated cover is a cover that has been used before. The electronic identifier may comprise a number. The stretcher may comprise a reader to read the number of the cover and to compare the number with a list of previously read numbers and to provide an alert and/or limit operation of the heated section when it is determined that the number matches a previously read number in the list. The electronic identifier may be configured to be updated after a use to provide an indication that the cover has been used to prevent re-use. In an embodiment, the electronic identifier registers with a reader positioned on the stretcher, preferably positioned in a housing for the power source (i.e. a battery housing). If the reader determines that the electronic identifier has been registered previously then the reader may output a command for an audible warning to be sounded. Additionally, or alternatively, if the reader determines that the electronic identifier has been registered previously then the reader may output a command to prevent use if re-use of the cover is attempted. Advantageously, this decreases contamination and increases hygiene because a cover is prevented, or discouraged, from being used for multiple patients. This has a further advantage that the stretcher can log a number of times that a cover is used (if the cover is re-used) and this log can be used to re-ordering more covers. Further metrics, such as how long a cover was positioned on the stretcher, may be derived from the electronic identifier. This advantageously provides for post-market surveillance information to be obtained and analysed to determine information regarding how the stretcher and covers are used.

The stretcher may comprise one or more of: a thermochromic ink, a thermochromic dye, and a thermochromic paint, disposed on a visible portion of the cover configured to provide a visual indication of a temperature along the stretcher. In embodiments, the stretcher may comprise one or more of: a thermochromic ink; a thermochromic dye; a thermochromic paint disposed on a visible portion of the stretcher configured to provide a visual indication of a temperature of the stretcher. Preferably the thermochromic ink; a thermochromic dye; a thermochromic paint are configured to change colours across a range of temperatures that the heated section is configured to operate at. This advantageously provides for a large range of colour change across the likely range of temperatures and therefore provides a high level of information to the medical staff. Advantageously, providing a visual indication such as thermochromic ink; a thermochromic dye; a thermochromic paint does not indicate an exact temperature to the attending medical staff. This is advantageous because it allows the medical staff to operate the stretcher easily, rather than a more precise digital display for example that may take more time and attention to read. Each of the thermochromic ink; the thermochromic dye; the thermochromic paint can be printed on the cover. Each of the thermochromic ink; the thermochromic dye; the thermochromic paint can be considered to be temperature indicators because they each change colour depending on temperature. Using a visual indicator as described above provides advantages over, for example, a display screen in combination with a sensor, because the visual indicators of embodiments of the invention are quicker and easier to read than, for example, a display screen in combination with a sensor.

The stretcher may comprise the power source. The power source may have at least two different user-adjustable power settings to provide at least lower and higher power heating, such that the user is able to use the visual indication of the temperature of the stretcher cover to adjust the power setting. In embodiments, user-adjustable may mean adjustable by a bearer of the stretcher. In other words, the power source may have at least an 'off' setting, a lower setting, and a higher setting. The visual indication of the temperature of the stretcher is intentionally simple to interpret and furthermore clearly visible. This, in combination with the power settings advantageously allows a user (e.g. medical staff such as a stretcher bearer) to easily operate the stretcher and adapt the power settings to needs of the patient. In embodiments, a visual indicator such as thermochromic material provides advantages over, for example an electronic temperature display, because the thermochromic material is easily viewed and interpreted by a user.

The stretcher may comprise a rigid layer positioned below the electrically conductive layer to support a user of the stretcher.

In embodiments, each of: the electrically conductive layer; the opposing electrically conductive elements; and the electrically insulating layer are configured to be flexible and the rigid layer is configured to fold along a fold line to reduce an extended length of the stretcher. Advantageously this allows the stretcher to fold up and be stored in a smaller space than otherwise. This is particularly advantageous if the stretcher is to be used by in restricted spaces, for example, an air ambulance, a rapid response vehicle, or carried in a back-pack.

The rigid layer may be positioned below the electrically conductive layer to support a patient on the stretcher.

The rigid layer may comprise multiple panels. The stretcher may be configured to fold along a gap between each of the multiple panels. Alternatively, the rigid layer may comprise a single panel comprising locally weakened or locally thinned portions defining predetermined fold locations. The single panel may be a thick full-length panel.

The stretcher may comprise a rigid layer positioned below the electrically conductive layer to support a user of the stretcher, for example to support a patient on the stretcher. The rigid layer may be configured to bow to provide the support to a user of the stretcher (e.g. to provide the support to a patient on the stretcher) along an extended length of the stretcher. To bow means to bend into a generally cylindrical shape. However, the stretcher may not form a complete cylinder that completely encapsulates the patient, rather the rigid layer may be configured to bow to form part of a cylinder.

The stretcher may comprise an extended section of the stretcher that extends beyond an end of the electrically conductive layer to provide an unheated portion of the stretcher for a user's head. Advantageously this provides an unheated portion of the stretcher, this is advantageous because, for some patients, the patients head may swell if heated. This should be avoided and therefore providing an unheated section for the patient's head is advantageous. Furthermore, the patient's legs are not heated which saves energy.

In a related aspect there is provided a foldable stretcher. The foldable stretcher may comprise a base layer. The base layer may comprise a flexible plastic sheet. The foldable stretcher may comprise a set of three patient support panels mounted sequentially on the base layer having gaps there between such that the base layer with the three patient support panels is foldable along each gap into a shorter, generally flat folded configuration. In an unfolded configuration the three patient support panels may be configured to support, respectively the head, back, and legs of a patient. The foldable stretcher may comprise a set of handles along each side of the stretcher in the unfolded configuration. When bearing a patient, the stretcher may bow along a longitudinal axis such that the combination of the base layer and patient support panels is prevented from buckling along the patient's back.

The foldable stretcher may come with a removeable plastic sheath. The set of handles along each side of the stretcher may comprise handles formed in the removeable plastic sheath. Also or instead a set of one or more handles on each side of the stretcher may comprise a set of hollow interconnecting poles. These may be supported by the cover, for example threaded through the cover. The poles may have ends which are configured so that one end of one pole fits inside another end of a second pole, e.g. similar to a tent pole. The poles for each set of one or more handles may be joined by elastic, e.g. shock cord. The poles may be made from metal such as steel or aluminium or composite such as fibreglass or carbon fibre composite.

The foldable stretcher may comprise a carbon-loaded silicone heating layer to heat the patient at least in a region of the patient's back.

The heated section may therefore form a uniformly heated rectangular area which is used to heat the shoulders, back and buttocks of a patient.

Embodiments of the invention therefore provide for a foldable, cleanable, soft, warmed stretcher configured to be powered by removable batteries. The stretcher is transparent to X-rays and is used with a single-use (or limited multiple-reuse) cover.

BRIEF DESCRIPTION OF THE DRAWINGS

These and other aspects of the invention will now be described, with reference to the accompanying drawings, in which.

DETAILED DESCRIPTION

Figure 1:
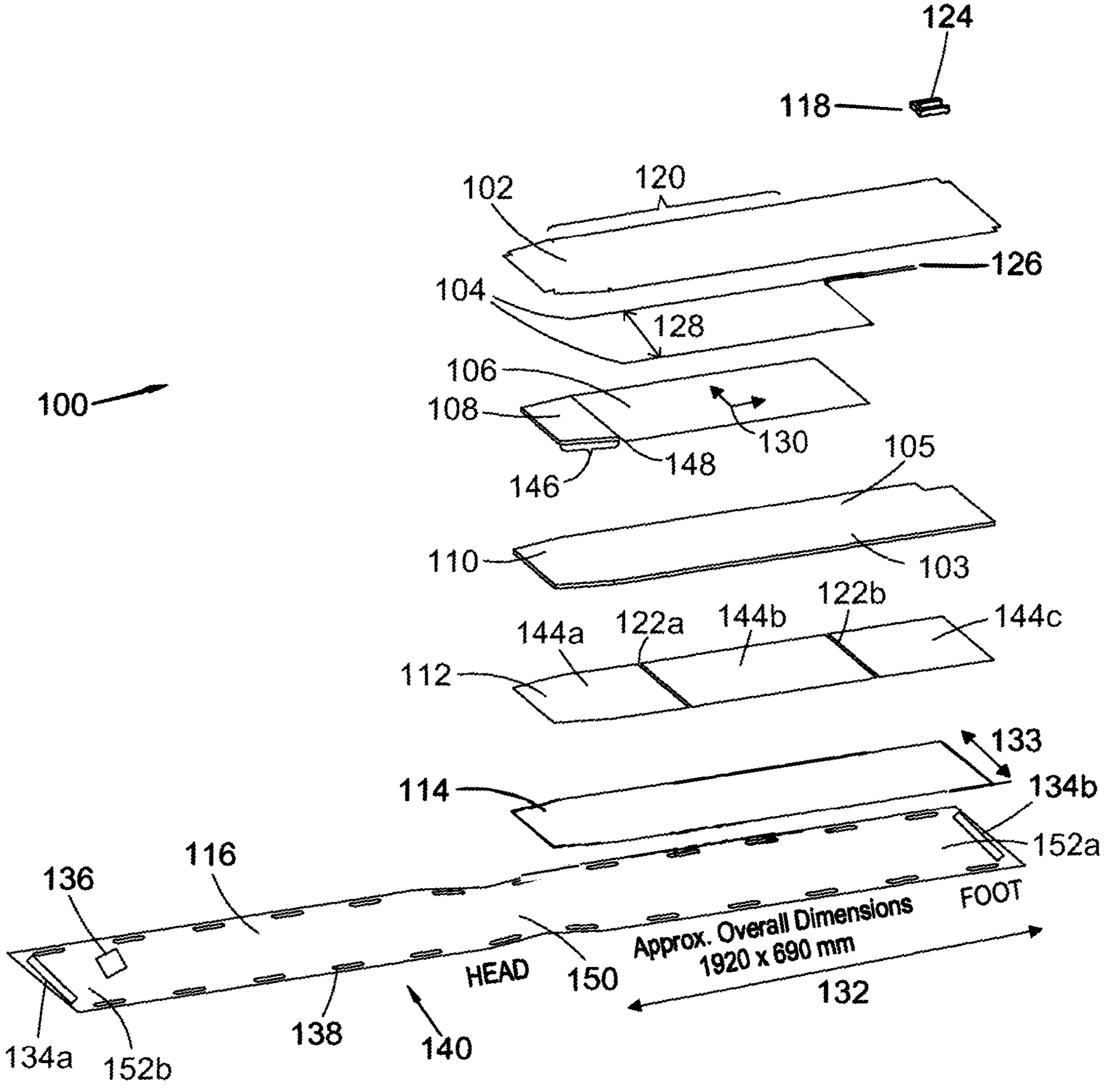
FIG. 1 shows an exploded view of a stretcher 100 with a heated section 120, according to an embodiment of the invention.

FIG. 1 shows an exploded view of a stretcher 100 with a heated section 120, the heated section 120 of the stretcher 100 comprises two opposing electrically conductive elements 104 positioned towards opposing sides 103 and 105 of the stretcher 100. The opposing electrically conductive elements 104 are connectable, at connection 126, to a power source.

The stretcher 100 comprises an electrically conductive layer 106 in electrical contact with the opposing electrically conductive elements 104. The electrically conductive layer 106 heats up when the opposing electrically conductive elements 104 are powered by the power source. The electrically conductive layer 106 is X-ray transparent to allow a patient to be X-rayed whilst on the stretcher 100.

In the illustrated embodiment, the electrically conductive layer 106 is a silicone rubber sheet manufactured loaded with carbon powder to give electrical conductivity. The approximate conductivity of the electrically conductive layer 106 is 50 Ω/□ (Ohms per square). An example size of electrically conductive layer 106 is 40 cm×100 cm, this shape forms about 40% of a square so the resistance from one side to the other is approximately 20Ω (Ohms). The electrically conductive layer 106 forms a heated area for the shoulders, back and buttocks. In the illustrated embodiment, the electrically conductive layer 106 is 3 mm. In the illustrated embodiment, the electrically conductive layer 106 is a carbon loaded silicone sheet. Such a sheet may be obtained from a number of suppliers.

In the illustrated embodiment, the opposing electrically conductive elements 104 comprises copper braid. However, other conductors may be used.

In the illustrated embodiment, the opposing electrically conductive elements 104 are stapled onto a base layer 114 of the stretcher. The staples therefore penetrate the layers placed between the opposing electrically conductive elements 104 and the base layer 114. However, other mechanisms of attached the opposing electrically conductive elements 104 are envisaged, for example stitching. The opposing electrically conductive elements 104 lead up to a battery housing 118. The opposing electrically conductive elements 104 may protrude through an insulating layer 102 in order to reach the battery housing 118, if this is the case then the opposing electrically conductive elements 104 are insulated by an electrically insulating wire covering for the protruding portion of the opposing electrically conductive elements 104. The base layer 114 is a flexible layer. In the illustrated embodiment, the base layer is approximately 1.8 m by 0.5 m in size.

The electrically conductive layer 106 comprises an electrical conductor extending in two dimensions 130 within the electrically conductive layer 106. The electrically conductive layer 106 comprises an electrical conductor extending substantially continuously in the two dimensions 130 within the electrically conductive layer 106.

The stretcher comprises an electrically insulating layer 102 configured to electrically insulate the electrically conductive layer 106 and at least a portion of the opposing electrically conductive elements 104 from a user of the stretcher 100. The insulating layer 102 is flexible. The insulating layer 102 is wrapped around edges of the conductive layer 106 and may be bonded to a base layer 114 of the stretcher 100. In the illustrated embodiment, the insulating layer 102 is a durable waterproof cleanable fabric used to cover a front of the stretcher 100. The insulating layer 102 may be sealed to a rear of the stretcher with adhesive.

Preferably the electrically conductive layer 106 comprises an electrically conductive polymer. Preferably the electrically conductive polymer is an electrically conductive elastomer. Preferably the electrically conductive layer 106 comprises silicone rubber. Preferably the electrically conductive layer comprises a conductive additive. Preferably the conductive additive comprises carbon. Preferably the electrically conductive layer 106 is made from carbon loaded silicone.

Preferably the electrically conductive layer 106 is configured to have a substantially uniform resistivity.

In the illustrated embodiment, a distance 128 between the opposing electrically conductive elements 106 is constant for a part of their length. In other words, the distance 128 is constant for a length of the opposing electrically conductive elements 106. This provides for a substantially constant resistance between a first of the opposing electrically conductive elements 106 and a second of the opposing electrically conductive elements 106. In other embodiments, a distance between the opposing electrically conductive elements 106 is reduced for part of their length to increase the patient heating in that part of their length. Specifically, a distance between the opposing electrically conductive elements 106 is reduced for a length aligned with a portion of the heated section 120 where a patient's shoulder would be positioned and also reduced where a patient's buttocks area would be positioned (when on the stretcher). The reduced distance between the opposing electrically conductive elements 106 provides less resistance, greater current, and therefore greater warming in the areas in greatest contact with the stretcher (i.e. shoulder and buttocks).

The stretcher 100 comprises a cover 116 intended for single use. In implementations, the cover 116 comprises an electronic identifier 136 for determining a metric associated with a use of the cover 116. The cover 116 is configured to cover an outer surface of the stretcher. The outer surface may be said to be a surface above the insulating layer 102 and a surface below a base layer 114.

The cover 116 may be considered to be an outer cover because, in embodiments, the cover 116 encloses the outer surface of the stretcher 100. The cover 116 may be a single use polymer liner. The cover 116 comprises handles 138 for stretcher bearers to hold when bearing a patient.

In the illustrated embodiment, the cover 116 is configured to fold around a head end 150 of the stretcher 100. At each foot end (152*a*, 152*b*), the cover 116 comprises an attachment 134*a*, 134*b* at each end, i.e. foot end and head end, of the stretcher, such as buttons, ziplock, or similar. Therefore, the cover 116 is configured to be folded around the head end 150 of the stretcher 100 and secured at the foot ends 152*a*, 152*b* via the attachments 134*a*, 134*b*. In other embodiments, the cover may be a sheath configured to be pulled over the outer surface of the stretcher 100. The cover therefore may comprise a thick polythene bag with carry handles on both sides and an attachment for sealing the opening when installed, the handles can be seen in FIG. 2 as handles 206.

The cover 116 is configured to be welded along each side. The cover 116 may comprise one or two flat plastic sheets, and may be manufactured by folding the sheet, or by placing one sheet over the other, and heat sealing the folded sheet/sheets to form a 3-sided closed "bag". Heat and pressure are used to create a heat seal along two or three sides of the cover therefore creating a "bag" into which the stretcher slides. An alternative way of forming the cover 116 is to glue 3 sides and heat seal and/or gluing the third side, in this example, a blown film method may be utilised.

The handles of the cover 116 are reinforced by doubling the thickness of the cover in the handle area. Other configurations to strengthen the handles may be used such as adding materials locally to strengthen the handles.

The electronic identifier 136 is configured to interact with a system for enforcing single use of the cover 116. The electronic identifier 136 comprises a number or other identifying character(s). The stretcher comprises a reader 124, e.g. housed in a battery housing 118, and configured to read the number of the cover 116 and to compare the number with a list of previously read numbers and to provide an alert and/or limit operation of the heated section 120 when it is determined that the number matches a previously read number in the list. The reader may include a microprocessor configured to perform such functions by program code stored in non-volatile memory. The battery housing 118 may further house an alarm sounder configured to sound an alarm when the reader 124 determines that the number matches a previously read number in the list. In the illustrated embodiment, the electronic identifier 136 is an RFID tag positioned on the cover 116 to prevent re-use of a contaminated cover. This registers on the reader 124 in the battery housing 118 and may either give an audible warning or prevent heated use if re-use is attempted.

The electronic identifier 136 is configured to be updated after a use to provide an indication that the cover 116 has been used to prevent re-use.

In the illustrated embodiment, the stretcher 100 comprises a thermochromic ink disposed on a visible portion 140 of the cover 116 configured to provide a visual indication of a temperature of the stretcher 100. In an alternative embodiment, the stretcher 100 comprises a thermochromic dye disposed on a visible portion 140 of the cover 116 configured to provide a visual indication of a temperature of the stretcher 100. In an alternative embodiment, the stretcher 100 comprises a thermochromic paint disposed on a visible portion 140 of the cover 116 configured to provide a visual indication of a temperature of the stretcher 100.

FIG. 1 shows the stretcher 100 comprising the battery housing 118 configured to house a battery or other power source.

FIG. 1 does not illustrate the stretcher 100 having a power source (e.g. a battery) housed within the battery housing 118, however, in embodiments, the stretcher 100 does comprise the power source (e.g. a battery). In such embodiments, the power source is housed in the battery housing 118. In such embodiments, the power source has at least two different user-adjustable power settings to provide at least lower and higher power heating, such that the user is able to use the visual indication 140 of the temperature of the cover 116 to adjust the power setting. The battery housing 118 comprises a user interface, such as a switch with labels, that allows the user to change between the lower, upper, and off settings.

The stretcher 100 comprises a rigid layer 112 positioned below the electrically conductive layer 106 to support a user of the stretcher 100. The rigid layer 112 may be still rigid enough to support a patient along an extended length 132 length of the stretcher but is flexible enough to bow when stretcher bearers bear the stretcher holding a patient.

In the embodiment illustrated in FIG. 1, each of: the electrically conductive layer 106; the opposing electrically conductive elements 104; and the electrically insulating layer 102 are configured to be flexible and the rigid layer 112 is configured to fold along a fold line 122 to reduce the extended length 132 of the stretcher 100. The extended length of the stretcher illustrated in FIG. 1 is 1920 mm. A minor length 133 of the stretcher illustrated in FIG. 1 is 690 mm. The extended length 132 and the minor length 133 the stretcher may vary between embodiments, however, the extended length 132 and minor length 133 of the stretcher 100 are such that a patient is able to lie on the stretcher.

The rigid layer 112 comprises multiple panels 144*a*, 144*b*, 144*c*. The stretcher 100 is configured to fold along a gap (e.g. 122) between multiple panels (gap 122 allows panels 144*a* and 144*b* to fold). The gaps 122*a*, 122*b* allow the base layer 114 to form a hinge and for the stretcher 100 to be folded into three sections. It should be understood that folding into three sections is just an example embodiment and the stretcher 100 may be configured to fold into any number of sections (e.g. 2, 4, 5 sections) for easy storage. When a patient lies on the stretcher 100, the base layer and the three panels 144*a*, 144*b*, 144*c* form all, or part of, a cylinder which is rigid along the length 132 of the patient.

The battery housing 118 may be secured by fasteners to the rigid panel 112 through any intervening layers (e.g. the electrically conductive layer).

The rigid layer 112 is configured to bow to provide the support to a patient on the stretcher 100 along the extended length 132 of the stretcher 100. In the illustrated embodiment, the rigid layer is bonded to the base layer 114.

The stretcher 100 comprises an extended section 146 of the stretcher 100 that extends beyond an end 148 of the electrically conductive layer 106 to provide an unheated portion 108 of the stretcher 100 for a patient's head.

In the illustrated embodiment, the stretcher 100 comprises a cushioning layer 110. The cushioning layer 110 may comprise foam. If the stretcher comprises the cushioning layer 110 then cushioning layer 110 may be placed between the electrically conductive layer 106 and the rigid layer 112. In the illustrated embodiment the cushioning layer 110 is 1.8 m×0.5 m×13 mm. A portion of the cushioning layer 110 may form the unheated portion 108. The unheated portion 108 may be thicker than (e.g. double the thickness of) a remainder portion of the cushioning layer 110.

Figure 2:
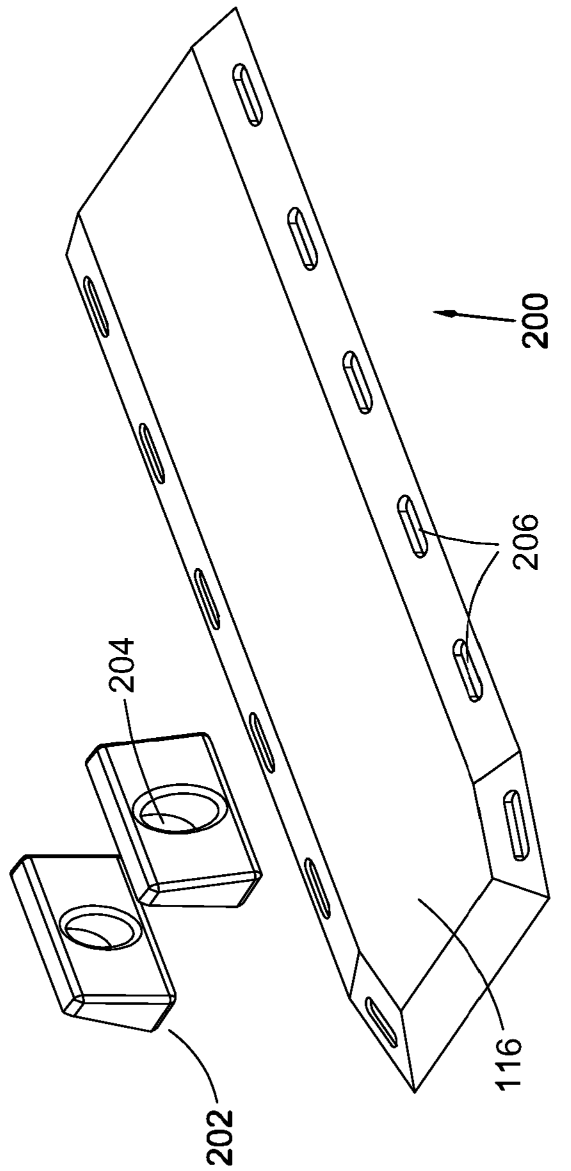
FIG. 2 shows a heated stretcher 200 with support blocks 202.

FIG. 2 shows a stretcher 200 according to an embodiment of the present invention. The cover 116 is covering the stretcher 200. The stretcher 100 comprises expanded polystyrene head restraints 202 configured to be fitted to the cover either side of a patient's head using either Velcro or double side sticky tape. The head restraints 202 are be configured to be single use. The head restraints 202 are wedge shaped and have a hole 204 in the middle to allow the patient to hear what is being said. The head restraints 202 are configured to be ridged and lightweight. The head restraints 202 comprise adhesive strips to attach the cover 115. The stretcher comprises multiple handles 206. The handles 206 are formed by the cover 116.

The invention claimed is:

1. A stretcher with a heated section, the heated section of the stretcher comprising:

two opposing electrically conductive elements positioned at, or towards, opposing sides of the stretcher, wherein the opposing electrically conductive elements are connectable to a power source;

an electrically conductive layer in electrical contact with the opposing electrically conductive elements, to heat up when the opposing electrically conductive elements are powered by the power source;

wherein the electrically conductive layer is X-ray transparent to allow a patient to be X-rayed whilst on the stretcher, the stretcher comprising a cover intended for single use and comprising an electronic identifier for determining a metric associated with a use of the cover, wherein the cover is configured to cover an outer surface of the stretcher.

2. The stretcher of claim 1 wherein the electrically conductive layer comprises an electrical conductor extending in two dimensions within the electrically conductive layer, in particular wherein the electrically conductive layer comprises an electrical conductor extending substantially continuously in two dimensions within the electrically conductive layer.

3. The stretcher of claim 1 further comprising:

an electrically insulating layer configured to electrically insulate:

the electrically conductive layer; and at least a portion of the opposing electrically conductive elements;

from a user of the stretcher.

4. The stretcher of claim 1, wherein the electrically conductive layer comprises a polymer with a carbon additive.

5. The stretcher of claim 1, wherein the electrically conductive layer is configured to have a substantially uniform resistivity.

6. The stretcher of claim 1, a distance between the opposing electrically conductive elements is constant for at least a part of their length.

7. The stretcher of claim 6, wherein the distance between the opposing electrically conductive elements is reduced for part of their length to increase the patient heating in that part of their length.

8. The stretcher of claim 1, wherein the electronic identifier is configured to interact with a system for enforcing single use of the cover.

9. The stretcher of claim 1, wherein the electronic identifier comprises a number, and wherein the stretcher comprises a reader to read the number of the cover and to compare the number with a list of previously read numbers and to provide an alert and/or limit operation of the heated section when it is determined that the number matches a previously read number in the list.

10. The stretcher of claim 1, wherein the electronic identifier is configured to be updated after a use to provide an indication that the cover has been used to prevent re-use.

11. The stretcher of claim 1, comprising one or more of: a thermochromic ink; thermochromic dye; and thermochromic paint disposed on a visible portion of the cover configured to provide a visual indication of a temperature along the stretcher.

12. The stretcher of claim 11 further comprising the power source, wherein the power source has at least two different user-adjustable power settings to provide at least lower and higher power heating, such that the user is able to use the visual indication of the temperature of the cover to adjust the power setting.

13. The stretcher of claim 12 comprising a rigid layer positioned below the electrically conductive layer to support a user of the stretcher, wherein:

each of: the electrically conductive layer; the opposing electrically conductive elements; and the electrically insulating layer are configured to be flexible and the rigid layer is configured to fold along a fold line to reduce an extended length of the stretcher.

14. The stretcher of claim 12 comprising a rigid layer positioned below the electrically conductive layer to support a user of the stretcher, wherein the rigid layer comprises multiple panels and wherein the stretcher is configured to fold along a gap between each of the multiple panels.

15. The stretcher of claim 12 comprising a rigid layer positioned below the electrically conductive layer to support a user of the stretcher, wherein the rigid layer is configured to bow to provide the support to a user of the stretcher along an extended length of the stretcher.

16. The stretcher of claim 1, comprising an extended section of the stretcher that extends beyond an end of the electrically conductive layer to provide an unheated portion of the stretcher for a user's head.

17. The stretcher of claim 1 wherein the stretcher is configured to be foldable, and further comprising:

a base layer comprising a flexible plastic sheet;

a set of three patient support panels mounted sequentially on the base layer having gaps therebetween such that the base layer with the three patient support panels is foldable along each gap into a shorter, generally flat folded configuration;

wherein in an unfolded configuration the three patient support panels are configured to support, respectively the head, back, and legs of a patient; and further comprising a set of handles along each side of the stretcher in the unfolded configuration; and wherein, when bearing a patient, the stretcher bows along a longitudinal axis such that the combination of the base layer and patient support panels is inhibited from buckling in a region of the patient's back.

18. The foldable stretcher of claim 7 with a removeable plastic sheath, wherein the set of handles along each side of the stretcher comprises handles formed in the removeable plastic sheath, and further comprising a carbon-loaded silicone heating layer to heat the patient at least in a region of the patient's back.

* * * * *